(12) United States Patent
Brogaard et al.

(10) Patent No.: US 9,327,230 B2
(45) Date of Patent: May 3, 2016

(54) METHOD AND A DEVICE FOR TREATING EFFLUENT SEAWATER FROM A SEAWATER SCRUBBER

(75) Inventors: Fredrik Jens Brogaard, Växjö (SE); Mikael Larsson, Mölndal (SE)

(73) Assignee: ALSTOM Technology Ltd, Baden (CH)

( * ) Notice: Subject to any disclaimer, the term of this patent is extended or adjusted under 35 U.S.C. 154(b) by 64 days.

(21) Appl. No.: 13/983,190

(22) PCT Filed: Feb. 2, 2012

(86) PCT No.: PCT/IB2012/000188
§ 371 (c)(1),
(2), (4) Date: Aug. 1, 2013

(87) PCT Pub. No.: WO2012/107817
PCT Pub. Date: Aug. 16, 2012

(65) Prior Publication Data
US 2013/0306556 A1    Nov. 21, 2013

(30) Foreign Application Priority Data
Feb. 10, 2011 (EP) ..................................... 11153959

(51) Int. Cl.
*C02F 1/72* (2006.01)
*B01D 53/14* (2006.01)
(Continued)

(52) U.S. Cl.
CPC .......... *B01D 53/1425* (2013.01); *B01D 53/507* (2013.01); *C02F 1/725* (2013.01); *C02F 3/342* (2013.01); *C02F 1/02* (2013.01); *C02F 1/32* (2013.01); *C02F 1/488* (2013.01);
(Continued)

(58) Field of Classification Search
USPC ................................................ 210/606, 150
See application file for complete search history.

(56) References Cited

U.S. PATENT DOCUMENTS 4,677,059 A * 6/1987 Beutler .................... C12Q 1/26
435/25
5,032,523 A * 7/1991 Amano ................. C12P 41/004
435/135

(Continued)

FOREIGN PATENT DOCUMENTS

CN         1158272 A      9/1997
CN      101215579 A      7/2008
(Continued)

OTHER PUBLICATIONS

Cohen and Fridovich, J. Biological Chemistry, vol. 246, No. 2, Jan. 1971, p. 359-366.*
European Search Report; European Searching Authority, EP Application No. 11153959, The Hague, Jun. 15, 2011.
International Search Report and Written Opinion; European Searching Authority, PCT Application No. PCT/IB2012/000188, European Patent Office, Completed Apr. 11, 2012.

*Primary Examiner* — Chester Barry
(74) *Attorney, Agent, or Firm* — Rita D. Vacca

(57) ABSTRACT

A gas cleaning system including a wet scrubber (14) for removal of sulphur dioxide from a gas and an oxidation basin system (42) for receiving effluent generated in the removal of sulphur dioxide from the process gas. The oxidation basin system (42) comprises an oxidation basin (43) for containing the effluent during treatment thereof, an oxygen supply system (47) for supplying oxygen to the effluent in the oxidation basin (43), and a contacting system for bringing the effluent into contact with an enzyme which catalyzes the oxidation of bisulphite and/or sulphite ions.

12 Claims, 4 Drawing Sheets

(51) Int. Cl.
  *B01D 53/50* (2006.01)
  *C02F 3/34* (2006.01)
  *C02F 1/02* (2006.01)
  *C02F 1/32* (2006.01)
  *C02F 1/48* (2006.01)
  *C02F 1/66* (2006.01)
  *C02F 1/74* (2006.01)
  *C02F 101/10* (2006.01)
  *C02F 103/16* (2006.01)
  *C02F 103/18* (2006.01)

(52) U.S. Cl.
  CPC  *C02F 1/66* (2013.01); *C02F 1/727* (2013.01); *C02F 1/74* (2013.01); *C02F 2101/101* (2013.01); *C02F 2103/16* (2013.01); *C02F 2103/18* (2013.01)

(56) References Cited

U.S. PATENT DOCUMENTS

| | | | | |
|---|---|---|---|---|
| 5,484,535 | A | * | 1/1996 | Downs ............... 210/724 |
| 7,329,532 | B2 | * | 2/2008 | Perriello ............ C02F 3/34 435/262 |
| 2007/0243591 | A1 | * | 10/2007 | Peeters ............ C12P 7/6436 435/134 |

FOREIGN PATENT DOCUMENTS

| | | |
|---|---|---|
| DE | 19752470 A1 | 6/1999 |
| JP | S63319026 | 12/1988 |
| JP | H09239233 A | 9/1997 |
| JP | 2010269248 A | 12/2010 |
| JP | 2012505734 A | 3/2012 |
| WO | 88/07023 A1 | 9/1988 |
| WO | 01/41902 A1 | 6/2001 |
| WO | 2010/116482 A1 | 10/2010 |

* cited by examiner

METHOD AND A DEVICE FOR TREATING EFFLUENT SEAWATER FROM A SEAWATER SCRUBBER

This is a US National Phase application claiming priority to International Application No. PCT/IB2012/000188 having an International Filing Date of Feb. 2, 2012, incorporated herein in its entirety by reference.

FIELD OF THE INVENTION

The present invention relates to a method of treating effluent seawater generated in the removal of sulphur dioxide from a process gas by contacting the process gas containing sulphur dioxide with seawater.

The present invention further relates to a seawater based process gas cleaning system comprising a wet scrubber in which a process gas is brought into contact with seawater for removal of sulphur dioxide from said process gas.

BACKGROUND OF THE INVENTION

In many industrial processes a process gas containing pollutants is generated. One such industrial process is the combustion of a fuel, such as coal, oil, peat, waste, etc., in a combustion plant, such as a power plant, whereby a hot process gas is generated, often referred to as a flue gas, containing pollutants including acid gases, such as sulphur dioxide, $SO_2$. It is necessary to remove as much of the acid gases as possible from the flue gas before the flue gas may be emitted to the ambient air. Another example of an industrial process in which a process gas containing pollutants is generated is the electrolytic production of aluminium from alumina. In that process, a process gas containing sulphur dioxide, $SO_2$, is generated within venting hoods of the electrolytic cells.

U.S. Pat. No. 5,484,535 discloses a seawater scrubber. In the seawater scrubber seawater taken from the ocean is mixed with flue gas from a boiler. In the seawater scrubber sulphur dioxide, $SO_2$, is absorbed in the seawater and forms sulphite and/or bisulphite ions. Effluent seawater from the seawater scrubber is forwarded to an aeration pond. Air is bubbled through the effluent seawater in the aeration pond for the purpose of oxidizing, by means of oxygen gas contained in the air, sulphite and/or bisulphite ions to sulphate ions that may be released back to the ocean together with the effluent seawater.

SUMMARY OF THE INVENTION

An object of the present invention is to provide a method of treating effluent seawater from a gas desulphurization process utilizing seawater, the method being more efficient than that of the prior art.

The above-noted object is achieved by means of a method of treating effluent seawater generated in the removal of sulphur dioxide from a process gas by contacting the process gas containing sulphur dioxide with the seawater. The method comprises bringing the effluent seawater into contact with oxygen in the presence of an enzyme active for catalyzing oxidation of bisulphite and/or sulphite ions of the effluent seawater to form sulphate ions.

An advantage of this method is that the oxidation of bisulphite and/or sulphite ions is performed under enzyme catalyzed conditions. Hence, the amount of oxygen supplied to the effluent seawater may be reduced. A reduction in the amount of oxygen supplied to the effluent seawater reduces operating and investment costs of the seawater based gas cleaning system.

According to one embodiment, the method comprises blowing an oxygen containing gas into the effluent seawater, to form a mixing region in which the oxygen containing gas and effluent seawater is mixed with said enzyme present adjacent to said mixing region. An advantage of this embodiment is that the efficiency of the oxidation reaction is further enhanced by providing enzyme adjacent to the mixing region in which there is available a large concentration of oxygen.

In one embodiment, the method further comprises supplying an enzyme solution to said effluent seawater. An advantage of this embodiment is that fresh enzyme solution is continuously supplied to the effluent seawater, making oxidation reactions reliable and fast.

In another embodiment, the method further comprises bringing the effluent seawater into contact with oxygen in the presence of said enzyme immobilized on at least one carrier. An advantage of this embodiment is that enzymes that are efficient, but costly, and/or enzymes that are efficient but must not be disposed of together with the effluent seawater, can also be utilized. Immobilized enzymes would not be immediately consumed, but could be utilized for enhancing oxidation efficiency for long periods of time.

According to one embodiment, the method further comprises mixing said enzyme immobilized on carriers in the form of carrier bodies with the effluent seawater. An advantage of this embodiment is that enzyme can be well mixed with the effluent seawater, but may still be removed from the effluent seawater before disposing of the effluent seawater into, for example, the ocean.

According to another embodiment, the method comprises passing the effluent seawater through an oxidation basin in which at least one carrier in the form of at least one fixed enzyme supporting structure carrying said enzyme in an immobilized state is fixed. An advantage of having fixed enzyme carriers is that a simple and robust design is obtained.

A further object of the present invention is to provide a seawater based process gas cleaning system which is more efficient than that of the prior art.

The above-noted object is achieved by means of a seawater based process gas cleaning system comprising a wet scrubber in which a process gas is brought into contact with seawater for removal of sulphur dioxide from said process gas, and an oxidation basin system for receiving effluent seawater generated in the wet scrubber in conjunction with the removal of sulphur dioxide from the process gas. The oxidation basin system comprises an oxidation basin for containing the effluent seawater during treatment thereof, an oxygen supply system for supplying oxygen to the effluent seawater in the oxidation basin, and an enzyme contacting system for bringing the effluent seawater into contact with an enzyme which catalyses the oxidation of bisulphite and/or sulphite ions of the effluent seawater into sulphate ions.

An advantage of this gas cleaning system is that investment and operating costs related to oxidative treatment of effluent seawater may be reduced compared to that of the prior art.

According to one embodiment, the enzyme contacting system of the oxidation basin system comprises at least one carrier on which said enzyme is immobilized, the carrier being, at least occasionally, immersed in the oxidation basin. An advantage of this embodiment is that good contact between enzymes and effluent seawater may be obtained, while still keeping the enzymes in the oxidation basin.

According to one embodiment, said at least one carrier comprises carrier bodies to be dispersed in the effluent seawater in the oxidation basin.

In one embodiment, the oxidation basin system may further comprise an enzyme carrier body transporting system removing carrier bodies from the effluent seawater at a capture position of the oxidation basin, and returning the carrier bodies to the oxidation basin upstream of the capture position. An advantage of this embodiment is that a particularly good mixing of effluent seawater and enzymes is made possible.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
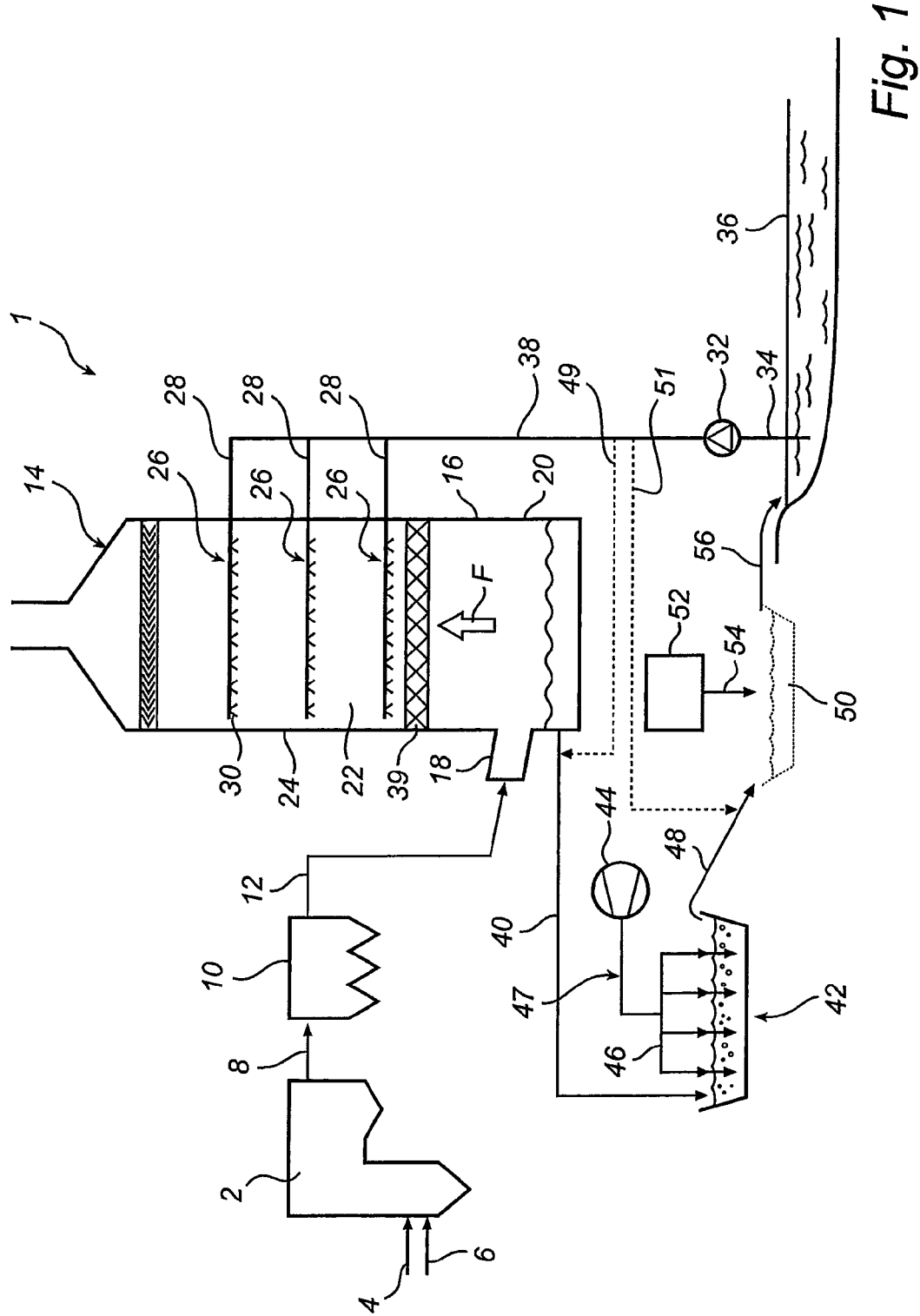
FIG. 1 is a schematic side cross-section view of a power plant with a seawater based gas cleaning system.

FIG. 1 is a schematic side cross-section view illustrating a power plant 1. The power plant 1 comprises a boiler 2 in which a fuel, such as coal or oil, supplied via feeding pipe 4 is combusted in the presence of oxygen, supplied via oxygen supply duct 6. The oxygen may, for example, be supplied in the form of air, and/or in the form of a mixture of oxygen gas and recirculated gases, in case the boiler 2 would be a so-called oxy-fuel boiler. The combustion of the fuel generates a hot process gas in the form of a flue gas. Sulphur species contained in the coal or oil upon combustion form sulphur dioxide, $SO_2$, which will form part of the flue gas.

The flue gas may flow from the boiler 2, via a fluidly connected duct 8, to an optional dust removal device in the form of an electrostatic precipitator 10. The electrostatic precipitator 10, an example of which is described in U.S. Pat. No. 4,502,872, serves to remove dust particles from the flue gas. As alternative, another type of dust removal device may be used, for example a fabric filter, an example of which is described in U.S. Pat. No. 4,336,035.

The flue gas, from which most of the dust particles have been removed, flows from the electrostatic precipitator 10, via a fluidly connected duct 12, to a seawater scrubber 14. The seawater scrubber 14 comprises a wet scrubber tower 16. An inlet 18 is arranged at a lower portion 20 of the wet scrubber tower 16. The duct 12 is fluidly connected to the inlet 18, such that flue gas flowing from electrostatic precipitator 10 via duct 12 may enter interior 22 of wet scrubber tower 16 via inlet 18.

After entering interior 22, flue gas flows vertically upward through wet scrubber tower 16, as indicated by arrow F. Central portion 24 of wet scrubber tower 16 is equipped with a number of spray arrangements 26 arranged vertically one above each other. In the example of FIG. 1, there are three such spray arrangements 26, and typically there are 1 to 20 such spray arrangements 26 in a wet scrubber tower 16. Each spray arrangement 26 comprises a supply pipe 28 and a number of nozzles 30 fluidly connected to the respective supply pipe 28. Seawater supplied via the respective supply pipes 28 to the nozzles 30 is atomized by means of the nozzles 30 and is brought into contact, in interior 22 of wet scrubber tower 16, with the flue gas to absorb sulphur dioxide, $SO_2$, from the flue gas.

A pump 32 is arranged for pumping seawater via fluidly connected suction pipe 34 from ocean 36, and forwarding the seawater via fluidly connected pressure pipe 38 to fluidly connected supply pipes 28.

In accordance with an alternative embodiment, the seawater supplied by pump 32 to pipes 28 may be seawater previously utilized as cooling water in steam turbine systems associated with the boiler 2 prior to such seawater being utilized as scrubbing water in the seawater scrubber 14.

Seawater atomized by means of nozzles 30 in interior 22 of wet scrubber tower 16 flows downward in wet scrubber tower 16 and absorbs sulphur dioxide from the flue gas F flowing vertically upward in interior 22 of wet scrubber tower 16. As a result of such absorption of sulphur dioxide the seawater gradually turns into effluent seawater while moving downward in interior 22 of wet scrubber tower 16. Effluent seawater is collected in lower portion 20 of the wet scrubber tower 16 and is forwarded, via fluidly connected effluent pipe 40, from the wet scrubber tower 16 to an oxidation basin system 42.

In accordance with an alternative embodiment, the seawater scrubber 14 may comprise one or more layers of a packing material 39 arranged in interior 22 of wet scrubber tower 16. The packing material 39, which may be made from plastic, steel, wood, or another suitable material, enhances gas-liquid contact. With packing material 39, the nozzles 30 would merely distribute seawater over packing material 39, rather than atomizing the seawater. Examples of packing material 39 include Mellapak™ available from Sulzer Chemtech AG, Winterhur, CH, and Pall™ rings available from Raschig GmbH, Ludwigshafen, DE.

Optionally, fresh seawater may be added to the effluent seawater prior to further treatment of the effluent seawater. To this end, a pipe 49 may be fluidly connected to pressure pipe 38 to forward a flow of fresh seawater to fluidly connected effluent pipe 40 forwarding effluent seawater to oxidation basin system 42. Hence, an intermixing of fresh seawater and effluent seawater occurs in pipe 40. As an alternative, the fresh seawater forwarded via pipe 49 may be forwarded directly to oxidation basin system 42 for being mixed with the effluent seawater therein. As a still further option, residual waters and/or condensates generated in the boiler 2 or steam turbine systems associated therewith could be mixed with the effluent seawater.

The absorption of sulphur dioxide in interior 22 of wet scrubber tower 16 is assumed to occur according to the following reaction:

$$SO_2(g) + H_2O => HSO_3^-(aq) + H^+(aq)$$ 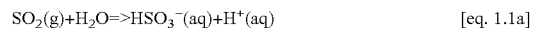 [eq. 1.1a]

The bisulphite ions, $HSO_3^-$, may, depending on the pH value of the effluent seawater, dissociate further to form sulphite ions, $SO_3^{2-}$, in accordance with the following equilibrium reaction:

$$HSO_3^-(aq) <=> SO_3^{2-}(aq) + H^+(aq)$$ 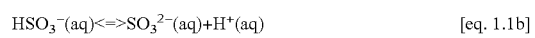 [eq. 1.1b]

Hence, as an effect of the absorption of sulphur dioxide, the effluent seawater will have a lower pH value as an effect of the hydrogen ions, $H^+$, generated in the absorption, than that of the fresh seawater from the ocean 36, and will contain bisulphite and/or sulphite ions, $HSO_3^-$ and $SO_3^{2-}$, respectively.

Bisulphite and/or sulphite ions are oxygen demanding substances, and the release thereof to the ocean 36 is restricted.

In the oxidation basin system 42, the bisulphite and/or sulphite ions, $HSO_3^-$ and/or $SO_3^{2-}$, are oxidized, at least partly, by reacting the same with oxygen, in accordance with the following reactions:

$$HSO_3^- + H^+ + \tfrac{1}{2}O_2(g) => SO_4^{2-} + 2H^+ \qquad [\text{eq. 1.2a}]$$

$$SO_3^{2-} + 2H^+ + \tfrac{1}{2}O_2(g) => SO_4^{2-} + 2H^+ \qquad [\text{eq. 1.2b}]$$

Optionally, the oxidation basin system 42 may comprise a compressor or a blower 44 which is arranged for blowing, via fluidly connected ductwork 46, an oxygen containing gas, such as air, into the effluent seawater. The blower 44 and the ductwork 46 together form an oxygen supply system 47 for supplying oxygen to the effluent seawater. A more detailed description of the oxidation basin system 42 will be given hereinafter with reference to FIG. 2.

The effluent seawater is, optionally, forwarded, via a fluidly connected overflow pipe 48, from the oxidation basin system 42 to a neutralization basin 50. A storage 52 of neutralization agent is, optionally, arranged for supplying neutralization agent, via fluidly connected pipe 54, to neutralization basin 50. The neutralization agent may, for example, be limestone or fresh seawater from the ocean, which serves to neutralize, at least partly, the hydrogen ions, $H^+$, generated in the effluent seawater as an effect of the absorption of sulphur dioxide, and as an effect of the oxidation of bisulphite ions into sulphur dioxide in accordance with equations 1.1a-b and 1.2a. The neutralization could occur according to the following scheme;

$$H^+ + HCO_3^- => H_2O + CO_2 \qquad [\text{eq. 1.3}]$$

The effluent seawater is, finally, forwarded via a fluidly connected overflow pipe 56 from the neutralization basin 50 and back to the ocean 36.

In accordance with an alternative embodiment, the effluent seawater forwarded via overflow pipe 48 is forwarded directly to the ocean 36 without passing any neutralization basin. In accordance with a further alternative embodiment, the effluent seawater is mixed with fresh seawater prior to being discharged into the ocean 36. To this end a pipe 51 may be fluidly connected to pressure pipe 38 to forward a flow of fresh seawater to fluidly connected overflow pipe 48. Hence, an intermixing of fresh seawater and effluent seawater occurs in pipe 48.

Figure 2:
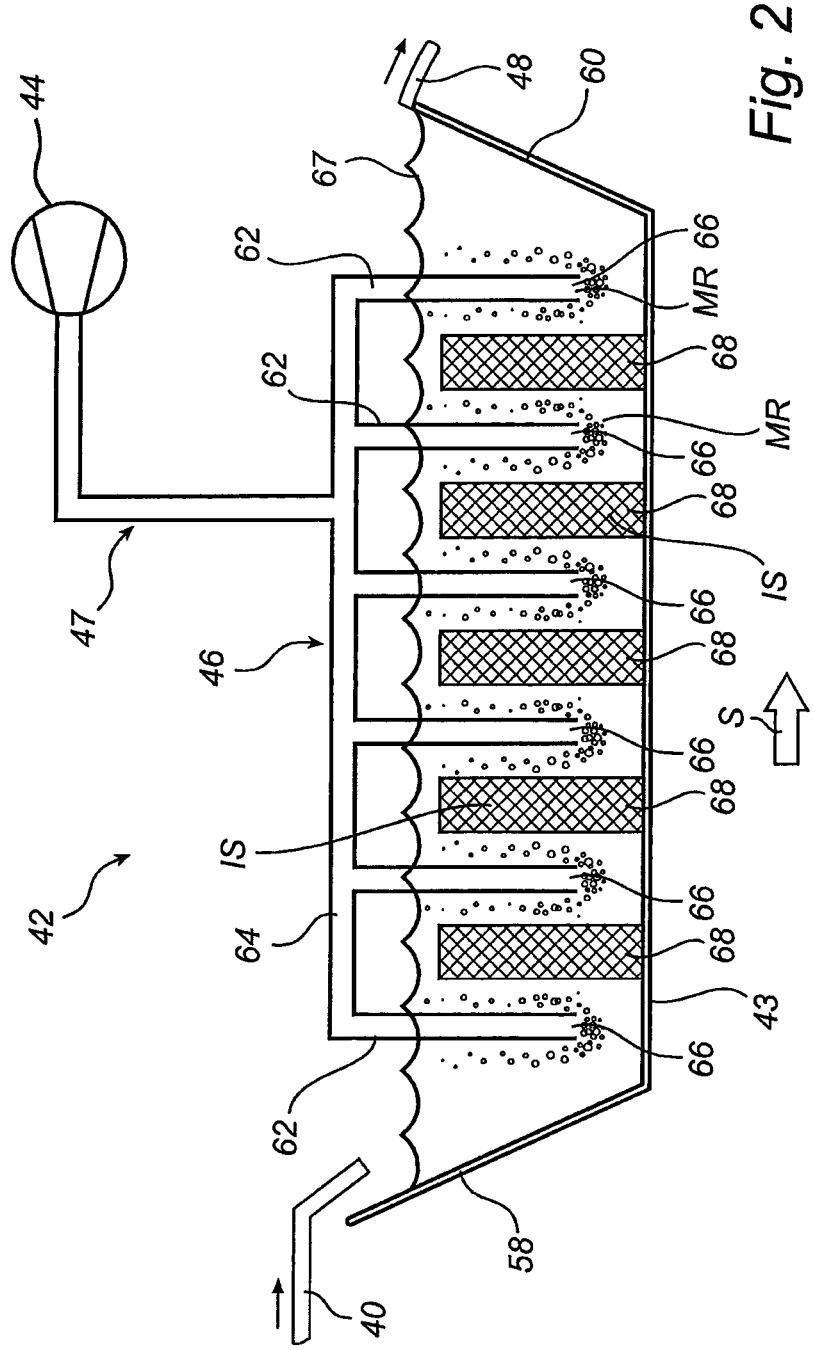
FIG. 2 is a schematic side cross-section view illustrating an oxidation basin system in accordance with a first embodiment.

FIG. 2 illustrates the oxidation basin system 42 in more detail. Effluent seawater is supplied to an oxidation basin 43 of the oxidation basin system 42 via fluidly connected duct 40 at a first end 58, being an inlet end, of oxidation basin 43. The effluent seawater flows, generally horizontally as indicated by arrow S, from the first end 58 to a second end 60, being an outlet end, of oxidation basin 43. At the second end 60, the effluent seawater overflows into fluidly connected overflow pipe 48 and leaves basin 43.

Oxidation basin system 42 further includes the oxygen supply system 47 having the ductwork 46. The ductwork 46 comprises a number of air distribution pipes 62, which are fluidly connected to a central distribution duct 64. Blower 44 blows air into central distribution duct 64 and further into air distribution pipes 62. The lower ends 66 of air distribution pipes 62 are open and are arranged below liquid surface 67 of oxidation basin 43. The air distribution pipes 62 are distributed along the oxidation basin 43, between the first end 58 and the second end 60 thereof. Air blown by blower 44 is forwarded, via central distribution duct 64 and air distribution pipes 62 to open lower ends 66. At open ends 66 the air is dispersed and mixed with the effluent seawater. At least a portion of the oxygen content of the air thus dispersed and mixed with effluent seawater is dissolved in the effluent seawater and reacts to oxidize sulphite and/or bisulphate ions.

In accordance with an alternative embodiment, the oxygen supply system 47 may be operative for blowing an oxygen rich gas, comprising more than 21% by volume of oxygen, for example comprising 75-100% by volume of oxygen, into the effluent seawater of the oxidation basin 43.

The oxidation basin system 42 is provided with at least one enzyme contacting system in the form of an enzyme supporting structure 68 arranged in and fixed to oxidation basin 43. The enzyme supporting structure 68, being an enzyme carrier of a fixed type, may be a grid, mesh, fiber structure, etc., made from wood, plastic, metal, glass, ceramics, or another material on which enzyme may be kept in an immobilized state in accordance with per se known methods, as known from, for example, "*Immobilization of Enzymes and Cells*", Jose M. Guisan, Humana Press Inc. Totowa N.J., USA, Second edition, 2006. The enzyme supporting structure 68 may be of such an open design that effluent seawater S, may flow through the supporting structure 68, thereby obtaining efficient contact between effluent seawater and oxygen in the presence of enzyme.

The enzyme is of a type which catalyses the oxidation of bisulphite and/or sulphite ions in accordance with the general equations 1.2a-b described hereinbefore. Hence, the enzyme may be a so-called sulphite oxidase. A sulphite oxidase may be prepared in accordance with the article "*Optimization of expression of human sulfite oxidase and its molybdenum domain*" by C A Temple, T N Graf, and K V Rajagopalan, published in Arch Biochem Biophys. 2000 Nov. 15; 383(2): 281-7. Other types of enzymes, that catalyze the oxidation of bisulphite and/or sulphite ions, can also be utilized. The enzyme catalyzed oxidation processes could be written:

$$HSO_3^- + H^+ + \tfrac{1}{2}O_2(g) + \text{enzyme} => SO_4^{2-} + 2H^+ + \text{enzyme} \qquad [\text{eq. 2.1a}]$$

$$SO_3^{2-} + 2H^+ + \tfrac{1}{2}O_2(g) + \text{enzyme} => SO_4^{2-} + 2H^+ + \text{enzyme} \qquad [\text{eq. 2.1b}]$$

Hence, the enzyme increases the rate of the oxidation reactions, without being consumed itself. Thus, the oxygen of the air supplied by blower 44 to open ends 66 via central distribution duct 64 and air distribution pipes 62 is mixed with effluent seawater in mixing regions MR adjacent to the respective open ends 66. The enzyme supporting structures 68 are arranged adjacent to the respective mixing regions MR. The mixture of oxygen and effluent seawater then flows further through enzyme supporting structures 68 in the interior space IS of which the oxidation catalyzed by the enzyme proceeds in accordance with equations 2.1a-b given above. Thanks to the enzyme, the amount of air that needs to be blown by blower 44 into effluent seawater can be reduced, because the enzyme enhances the degree of utilization of the oxygen supplied to effluent seawater, hence reducing the amount of energy consumed by blower 44. Furthermore, it may also be possible to reduce the size of oxidation basin 43, and/or the size and/or number of blowers 44.

According to an alternative embodiment, enzyme producing bacteria are immobilized on the supporting structure 68, resulting in continuous release of freshly produced sulphite oxidation catalyzing enzymes into the oxidation basin 43 from the bacteria. Such bacteria, for example *Escherichia coli*, could be prepared in accordance with the above mentioned article by C A Temple et al.

Figure 3:
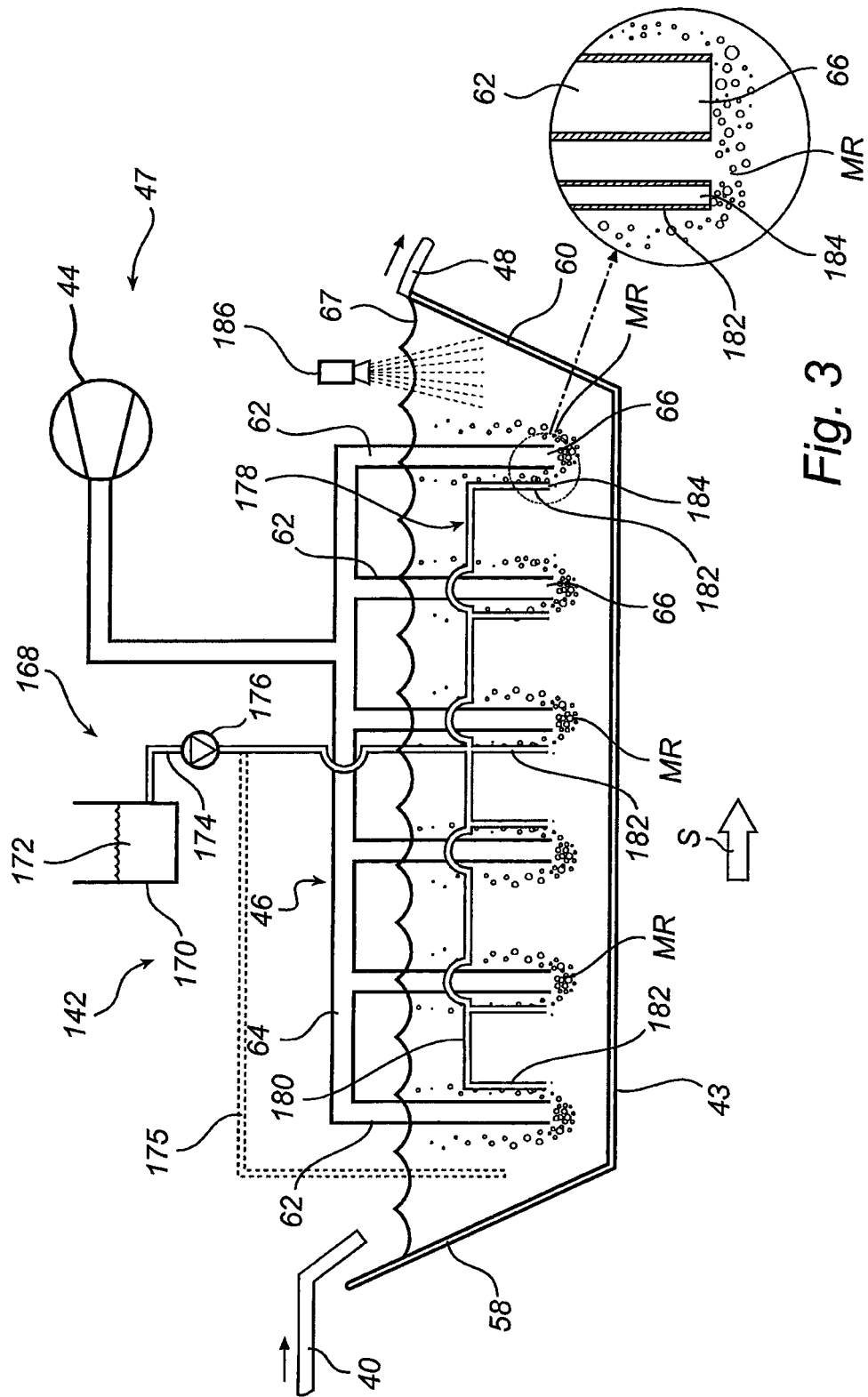
FIG. 3 is a schematic side cross-section view illustrating an oxidation basin system in accordance with a second embodiment.

FIG. 3 is a schematic representation of an alternative oxidation basin system 142. Those items of the oxidation basin system 142 that are similar to items of oxidation basin system 42 have been given the same reference numerals. Effluent seawater supplied to oxidation basin 43 of the oxidation basin system 142 via fluidly connected duct 40 will flow, generally horizontally as indicated by arrow S, from first end 58 to a second end 60 of oxidation basin 43. At second end 60, the effluent seawater overflows into fluidly connected overflow pipe 48 and leaves basin 43.

Air blown by blower 44 of oxygen supply system 47 is forwarded, via fluidly connected ductwork 46 comprising central distribution duct 64 and air distribution pipes 62, to open ends 66 at which the air is dispersed and mixed with the effluent seawater. At least a portion of the oxygen content of the air thus dispersed and mixed with effluent seawater is dissolved in the effluent seawater. Thus, the oxygen of the air supplied by blower 44 to open ends 66 via central distribution duct 64 and air distribution pipes 62 is mixed with effluent seawater in mixing regions MR adjacent to the respective open ends 66.

The oxidation basin system 142 is provided with at least one enzyme contacting system in the form of an enzyme supply system 168. The enzyme supply system 168 comprises an enzyme tank 170, which contains an enzyme solution 172 which contains an enzyme which is active for promoting the oxidation of bisulphite and/or sulphite ions in accordance with equations 2.1a-b. For example, the enzyme may be a sulphite oxidase enzyme. The enzyme supply system 168 further comprises a supply pipe 174 which is fluidly connected to tank 170, and a supply pump 176 arranged on said supply pipe 174 for forwarding enzyme solution 172 from tank 170 to an enzyme supply grid 178 fluidly connected to supply pipe 174.

The enzyme supply grid 178 comprises a central distribution pipe 180 fluidly connected to the supply pipe 174, and to a number of enzyme distribution pipes 182 fluidly connected to the central distribution pipe 180. The lower ends 184 of enzyme distribution pipes 182 are open and are arranged below liquid surface 67 of oxidation basin 43 adjacent to open ends 66 of air distribution pipes 62. Enzyme solution 172 pumped by supply pump 176 is forwarded, via supply pipe 174, central distribution pipe 180 and enzyme distribution pipes 182, to open lower ends 184. At open ends 184 the enzyme solution is mixed with the air supplied from air distribution pipes 62 and effluent seawater in mixing region MR, as is illustrated in an enlargement to the right in FIG. 3. Supplying the enzyme solution 172 to the mixing region MR provides for efficient mixing of the enzyme with the effluent seawater and the air. In the mixture of air, effluent seawater, and enzyme solution of mixing region MR, the oxidation of bisulphite and/or sulphite ions in accordance with equations 2.1a-b will become very efficient. The enzyme solution will be mixed with the effluent seawater, and will leave oxidation basin 43 together with the effluent seawater via fluidly connected overflow pipe 48.

In accordance with an alternative embodiment, the enzyme solution 172 may be supplied at the liquid surface 67 of the oxidation basin 43. Such supply of the enzyme may be sufficient if the oxidation basin 43 is in itself heavily agitated, for example by a propeller agitator, or by the oxygen supplied to the tank 43.

Preferably enzyme solution 172 comprises an enzyme which is comparably inexpensive, which is biodegradable and which can be released to the ocean 36, illustrated in FIG. 1, without further treatment.

According to an alternative embodiment, at least a portion of the enzyme solution is supplied to oxidation basin 43 via a supply pipe 175 arranged adjacent to first end 58 of oxidation basin 43. In accordance with this embodiment, a substantial portion, or even the entire amount of the enzyme solution, is supplied at the first end 58 of the oxidation basin 43 and is repeatedly mixed with the air supplied from the open lower ends 66 of the air distribution pipes 62.

Furthermore, the enzymes could, as alternative to being supplied as a solution, be supplied as a solid powder, or in another form which is suitable for being mixed with the effluent seawater.

According to an alternative embodiment, enzyme producing bacteria, for example *Escherichia coli* prepared in accordance with the above-mentioned article by C A Temple et al., could be supplied to the tank 170 resulting in continuous production of enzymes in the tank 170. The bacteria are forwarded to the oxidation basin 43 from the tank 170 together with the enzymes, and are eventually discharged into the ocean 36. According to a further alternative embodiment, enzyme producing bacteria, for example of the above-mentioned type, could be immobilized in the tank 170 on a suitable support, for example supports being similar to the supports 68 mentioned hereinbefore with reference to FIG. 2, and produce, in situ, the enzyme. With the bacteria immobilized, the bacteria would remain immobilized in the tank 170 continuously producing fresh enzyme.

Optionally, the enzyme that has functioned as a catalyst in the oxidation tank 43 could be deactivated prior to being released to the ocean 36. According to one embodiment, an enzyme is utilized that is sensitive to higher pH-values, for example pH values above pH 5. Hence, when the effluent seawater is neutralized in the neutralization basin 50, depicted in FIG. 1, or is neutralized by being mixed with fresh seawater supplied via pipe 51 to overflow pipe 48, also depicted in FIG. 1, the enzyme may get deactivated. According to a further embodiment, a deactivating device, for example a UV-lamp 186, may be arranged adjacent to the second end 60. The UV-lamp emits UV-light into the effluent seawater in the tank 43. As the effluent seawater passes beneath the UV-lamp 186, the enzyme is deactivated by the UV-light. The deactivating device may also comprise a source of heat, increasing the temperature of the effluent seawater to a temperature at which the enzyme is deactivated. Still further, an enzyme could be selected that is deactivated upon contact with fresh seawater of the ocean 36.

Figure 4:
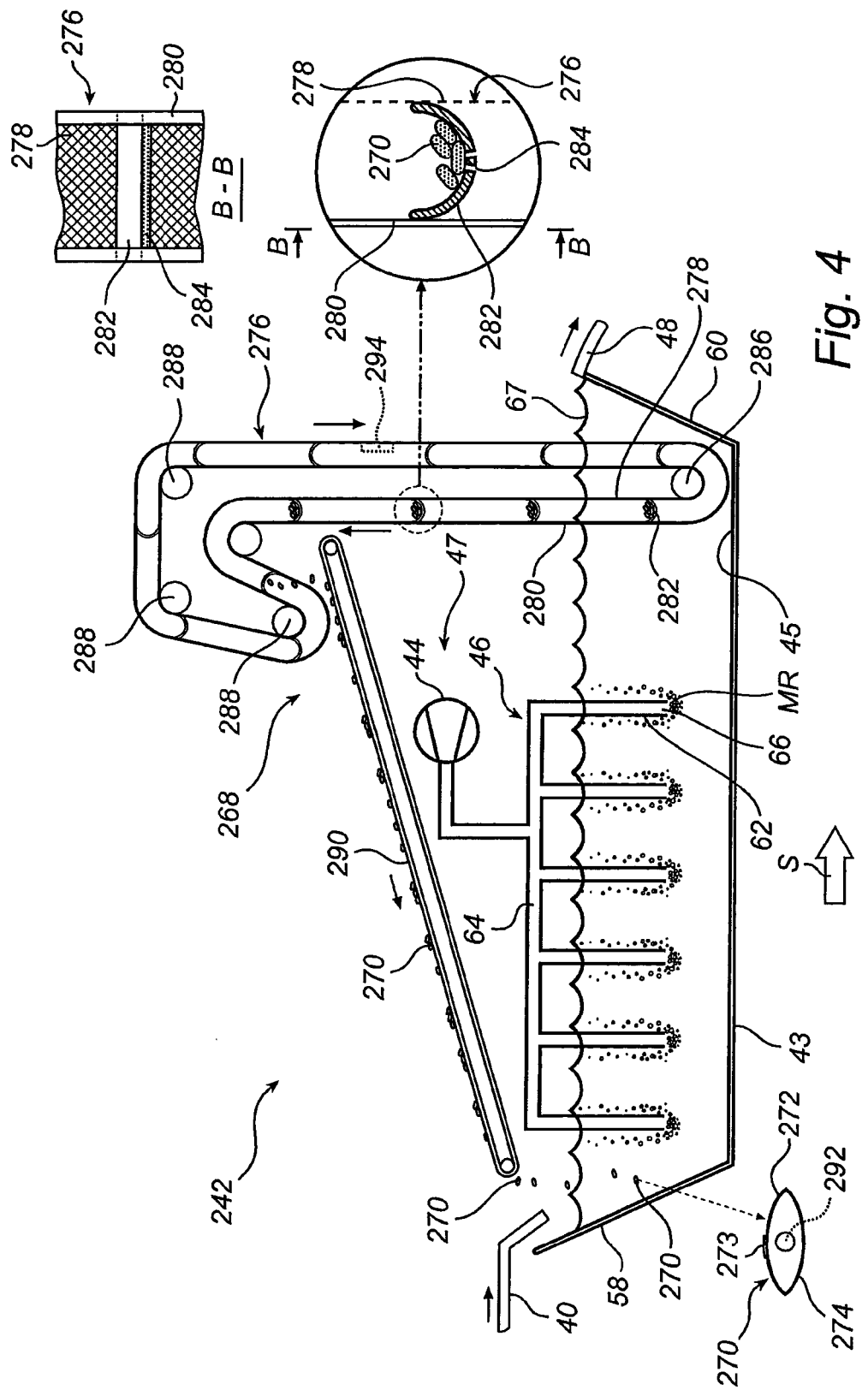
FIG. 4 is a schematic side cross-section view illustrating an oxidation basin system in accordance with a third embodiment.

FIG. 4 is a schematic representation of a further alternative oxidation basin system 242. Those items of the oxidation basin system 242 that are similar to items of oxidation basin system 42 have been given the same reference numerals. Effluent seawater supplied to oxidation basin 43 of the oxidation basin system 242 via fluidly connected duct 40 will flow, generally horizontally as indicated by arrow S, from first end 58 to second end 60 of oxidation basin 43. At second end 60, the effluent seawater overflows into fluidly connected overflow pipe 48 and leaves basin 43.

Air blown by blower 44 of oxygen supply system 47 is forwarded, via fluidly connected ductwork 46 comprising central distribution duct 64 and air distribution pipes 62, to open ends 66 at which the air is dispersed and mixed with the effluent seawater. At least a portion of the oxygen content of the air thus dispersed and mixed with effluent seawater is dissolved in the effluent seawater. Thus, the oxygen of the air supplied by blower 44 to open ends 66 via central distribution duct 64 and air distribution pipes 62 is mixed with effluent seawater in mixing regions MR adjacent to respective open ends 66.

The oxidation basin system 242 is provided with at least one enzyme contacting system in the form of an enzyme carrier body transporting system 268 transporting enzyme carrier bodies in the form of enzyme beads 270. The enzyme beads 270, an enlargement of which is illustrated to the left in FIG. 4, may be plastic hollow bodies 272 having enzymes 273, schematically illustrated in FIG. 4, immobilized on a surface 274 thereof. The enzymes 273 immobilized on surface 274 are active for promoting the oxidation of bisulphite and/or sulphite ions in accordance with equations 2.1a-b.

The enzyme carrier body transporting system 268 comprises a bead conveyor 276. The bead conveyor 276, an enlargement of which is illustrated, in side view, and, thereabove, in front view, to the right in FIG. 4, comprises a filter net 278 and support chains 280 holding between them a number of scoops 282. The filter net 278 has a mesh which is smaller than the size of the beads 270, such that beads 270 cannot pass through filter net 278. Each scoop 282 has a scoop net 284 arranged in the bottom thereof. The scoop net 284 has a mesh which is smaller than the size of the beads 270, such that beads 270 are retained in scoop 282, while effluent seawater passes through scoop net 284.

Bead conveyor 276 is forwarded vertically downward, as illustrated by an arrow, into oxidation basin 43 at a capture position located adjacent to second end 60 of basin 43. Bead conveyor 276 is turned around roller 286 arranged adjacent to bottom 45 of oxidation basin 43. Then bead conveyor 276 is forwarded vertically upward. Effluent seawater may pass through filter net 278. Enzyme beads 270, on the other hand, cannot pass through filter net 278, but are captured and collected in scoops 282 and are lifted upwards by bead conveyor 276. Scoops 282 move up and out of oxidation basin 43 and then passes a series of emptying rollers 288. The emptying rollers 288 makes scoops 282 turn up side down, at least partly, making collected beads 270 fall out of scoops 282. The beads 270 fall onto a transport conveyor 290. The transport conveyor 290 transports the beads 270 to the first end 58 of oxidation basin 43. At first end 58 of oxidation basin 43 the beads 270 are dropped off into oxidation basin 43, and are mixed with effluent seawater entering oxidation basin 43 via duct 40. Hence, the enzyme beads 270 are returned to the oxidation basin 43 upstream of the capture position located adjacent to second end 60 of basin 43. In accordance with an alternative embodiment, the capture position may be located at some other position in the basin 43, than adjacent to second end 60. A particularly efficient mixing of enzyme beads 270 and effluent seawater will be effected in the mixing regions MR adjacent to open ends 66 of air distribution pipes 62. In the mixture of air, effluent seawater, and enzyme beads 270 of mixing region MR, the oxidation of bisulphite and/or sulphite ions in accordance with equations 2.1a-b will become very efficient.

The enzyme beads 270 supplied at first end 58 will generally follow effluent seawater, transported horizontally in the direction indicated by arrow S, until the mixture of effluent seawater and beads 270 reaches the bead conveyor 276. Upon reaching bead conveyor 276, the beads 270 will be collected, and transported back to conveyor 290. The effluent seawater then leaves oxidation basin 43 via fluidly connected overflow pipe 48.

The enzyme beads 270 are described as being made of plastic. It will be appreciated that the enzyme beads could be made of other materials as well, such as metal, wood, glass, etc. Furthermore, it is described that the enzyme beads are collected on a bead conveyor 276. It will be appreciated that beads could be collected and separated from the effluent seawater in other manners, with nets, filters, or grids, etc. According to an alternative embodiment, the enzyme beads 270 could comprise magnetic material 292. The conveyor 276 could be provided with magnets 294, that could be permanent magnets or electromagnets, to facilitate collection of enzyme beads 270.

According to an alternative embodiment, the enzyme beads 270 could be returned to the oxidation basin 43 in a different position than at the first end 58. For example, the enzyme beads 270 could be returned to the centre of the oxidation basin 43.

According to a further alternative embodiment, the enzyme beads 270 collected by conveyor 276 may be returned to the oxidation basin 43 at various positions along the length of the oxidation basin 43, to thus obtain a distributed supply of enzymes along the length of the oxidation basin 43 according to a principle of enzyme distribution which is similar to that of enzyme supply grid 178 described hereinbefore with reference to FIG. 3.

It will be appreciated that numerous modifications of the embodiments described above are possible within the scope of the appended claims.

Hereinbefore, it has been described that the carrier bodies have the form of enzyme beads 270. It will be appreciated that many different types of carrier bodies could used. For example, the carrier bodies could be of types floating on the effluent seawater, sinking in the effluent seawater, or being suspended at some level in the effluent seawater. In accordance with one alternative embodiment, the enzyme beads 270 could have a higher specific weight than the effluent seawater. Such enzyme beads 270 could be made to circulate efficiently in the mixing regions MR by air bubbles attaching thereto. Hence, when such high specific weight enzyme beads 270 have passed through the last mixing region MR they will gradually sink to the oxidation basin 43 bottom 45 from which they may be collected and returned to the first end 58. In accordance with another alternative embodiment, the enzyme beads 270 could have a lower specific weight than the effluent seawater. Adjacent to the mixing regions MR the density of the effluent seawater is reduced by the air being bubbled therethrough, causing the beads 270 to circulate efficiently in the mixing regions MR. When such low specific weight enzyme beads 270 have passed through the last mixing region MR they will gradually rise to the oxidation basin 43 liquid surface 67 from which they may be collected and returned to the first end 58.

Hereinbefore it has been described that the seawater scrubber 14 removes sulphur dioxide from a process gas generated in the combustion of coal or oil in a boiler 2. It will be appreciated that the seawater scrubber 14 may also be utilized for cleaning process gases originating from other industrial processes. Examples of such other industrial processes includes metallurgical industries, for example industries of electrolytical production of aluminium, waste incineration industries, etc.

Hereinbefore it has been described that the oxygen is supplied to the effluent seawater in the oxidation basin 43 in the form of air blown by a blower 44 or a compressor. It will be appreciated that the oxygen could be supplied in other forms as well and with the help of other means. In accordance with one example, the oxygen could be supplied in the form of a more or less pure oxygen gas, for example an oxygen gas comprising at least 90% by volume of oxygen.

The oxygen may be supplied to the effluent seawater by other means than by means of blower 44. In accordance with an alternative embodiment, the oxygen may be supplied to the oxidation basin 43 by an agitator agitating the effluent seawater and drawing air into the effluent seawater.

To summarize, a gas cleaning system comprises a wet scrubber 14 for removal of sulphur dioxide from a gas, and an oxidation basin system 42 for receiving effluent generated in the removal of sulphur dioxide from the process gas. The oxidation basin system 42 comprises an oxidation basin 43 for containing the effluent during treatment thereof, an oxygen supply system 47 for supplying oxygen to the effluent in the oxidation basin 43, and a contacting system for bringing the effluent into contact with a substance which catalyses the oxidation of bisulphite and/or sulphite ions.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of treating effluent seawater generated in the removal of sulphur dioxide from a process gas by contacting the process gas containing sulphur dioxide with seawater, comprising:

blowing an oxygen-containing gas into the effluent seawater produced in the removal of sulphur dioxide from a process gas, contained in an oxidation basin via an oxygen supply system to form mixing regions in which the oxygen-containing gas enters the oxidation basin mixing with the effluent seawater; and arranging enzyme-supporting structures fixed within the oxidation basin in or adjacent the mixing region for mixed oxygen-containing gas and effluent seawater contact with an enzyme immobilized on the enzyme-supporting structures for catalyzing oxidation of bisulphite and/or sulphite ions in the effluent seawater to form sulphate ions by increasing the rate of oxidation reactions within the oxidation basin without consumption of the immobilized enzyme.

2. A method according to claim 1, wherein the enzyme-supporting structures are of a grid, mesh or fiber structure for carrying immobilized enzyme fixed in or adjacent to said mixing regions.

3. A method according to claim 1, further comprising supplying an enzyme solution to said effluent seawater.

4. A method according to claim 1, further comprising bringing the effluent seawater in contact with oxygen in the presence of an enzyme produced by bacteria immobilized on at least one carrier for catalyzing oxidation of bisulphite and/or sulphite ions in the effluent seawater to form sulphate ions.

5. A method according to claim 1, further comprising removing an enzyme immobilized on carrier bodies from the effluent seawater at a capture position a distance from the mixing regions, and returning the carrier bodies to the effluent seawater in or adjacent the mixing regions upstream of the capture position.

6. A seawater based process gas cleaning system comprising:

a wet scrubber for process gas contact with seawater for removal of sulphur dioxide from said process gas; and an oxidation basin system for receiving effluent seawater generated in the wet scrubber in conjunction with the removal of sulphur dioxide from the process gas comprising an oxidation basin for containing the effluent seawater during treatment thereof;

an oxygen supply system for supplying an oxygen-containing gas to the effluent seawater in the oxidation basin to form mixing regions in which the oxygen-containing gas enters the oxidation basin and mixes with the effluent seawater; and an enzyme-contacting system in or adjacent the mixing regions for bringing the mixed oxygen-containing gas and effluent seawater into contact with an enzyme immobilized on a fixed support to catalyzes the oxidation of bisulphite and/or sulphite ions in the effluent seawater into sulphate ions by increasing the rate of oxidation reactions within the oxidation basin without consumption of the immobilized enzyme.

7. A gas cleaning system according to claim 6, wherein the enzyme-contacting system of the oxidation basin system further comprises at least one support carrier on which said enzyme is immobilized, the support carrier being, at least occasionally, immersed in the oxidation basin in or adjacent the mixing regions.

8. A gas cleaning system according to claim 6, wherein said enzyme is immobilized on the fixed support of a grid, mesh or fiber structure fixed to the oxidation basin in or adjacent a mixing region.

9. A gas cleaning system according to claim 6, further comprising said enzyme produced by bacteria immobilized on support carrier bodies dispersed in the effluent seawater in or adjacent the mixing regions of the oxidation basin.

10. A gas cleaning system according to claim 6, further comprising an enzyme support carrier body transporting system removing said enzyme immobilized on support carrier bodies from the effluent seawater at a capture position of the oxidation basin a distance from the mixing regions, and returning the enzyme immobilized on the support carrier bodies to the oxidation basin in or adjacent the mixing regions upstream of the capture position.

11. A method according to claim 1, further comprising mixing said enzyme immobilized on support carrier bodies with the effluent seawater by dispersing the support carrier bodies in the mixing regions of the oxidation basin system.

12. A method according to claim 1, further comprising passing the effluent seawater through the oxidation basin with at least one fixed enzyme supporting structure carrying said enzyme produced by bacteria in an immobilized state for an increased rate of oxidation reactions within the oxidation basin without consumption of the immobilized enzyme.

* * * * *